US012428563B2

(12) United States Patent
Blair

(10) Patent No.: US 12,428,563 B2
(45) Date of Patent: *Sep. 30, 2025

(54) THERMALLY INSULATING AND FIRE RETARDANT MATERIAL AND METHOD FOR MAKING SAME

(71) Applicant: ZEROIGNITION TECHNOLOGIES INC., Halifax (CA)

(72) Inventor: Eamonn Martin Blair, Halifax (CA)

(73) Assignee: ZEROIGNITION TECHNOLOGIES INC., Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/764,720

(22) PCT Filed: Sep. 30, 2020

(86) PCT No.: PCT/CA2020/051308
§ 371 (c)(1),
(2) Date: Mar. 29, 2022

(87) PCT Pub. No.: WO2021/062538
PCT Pub. Date: Apr. 8, 2021

(65) Prior Publication Data
US 2022/0332951 A1    Oct. 20, 2022

Related U.S. Application Data

(60) Provisional application No. 62/908,434, filed on Sep. 30, 2019.

(51) Int. Cl.
C09C 1/30    (2006.01)
C09C 3/06    (2006.01)
(Continued)

(52) U.S. Cl.
CPC .......... C09C 1/3063 (2013.01); C09C 1/3045 (2013.01); C09C 3/06 (2013.01);
(Continued)

(58) Field of Classification Search
CPC ....... C09C 1/3063; C09C 1/3045; C09C 3/06; C09C 3/08; C09K 21/04; C09K 21/08;
(Continued)

(56) References Cited

U.S. PATENT DOCUMENTS 6,208,014 B1 * 3/2001 Wu ................... H01L 21/02282
257/632
8,288,455 B1 * 10/2012 Miller ....................... C08J 3/212
523/210
(Continued)

FOREIGN PATENT DOCUMENTS

CN     103265306        8/2013
CN     103906825 A      7/2014
(Continued)

OTHER PUBLICATIONS

CN 104229866 A (English Language Abstract). (Year: 2014).*

*Primary Examiner* — Joseph D Anthony
(74) *Attorney, Agent, or Firm* — Womble Bond Dickinson (US) LLP

(57) ABSTRACT

A fire retardant material includes a deconstructed nanoporous material including a plurality of elements, and solids of a fire-retarding solution within the elements of the nanoporous material. A method of forming the fire retardant material includes combining a nanoporous material and a fire-retarding solution such that elements of the nanoporous material absorb the fire retarding solution, and evaporating liquid from the elements of the nanoporous material having (Continued)

Figure 1:
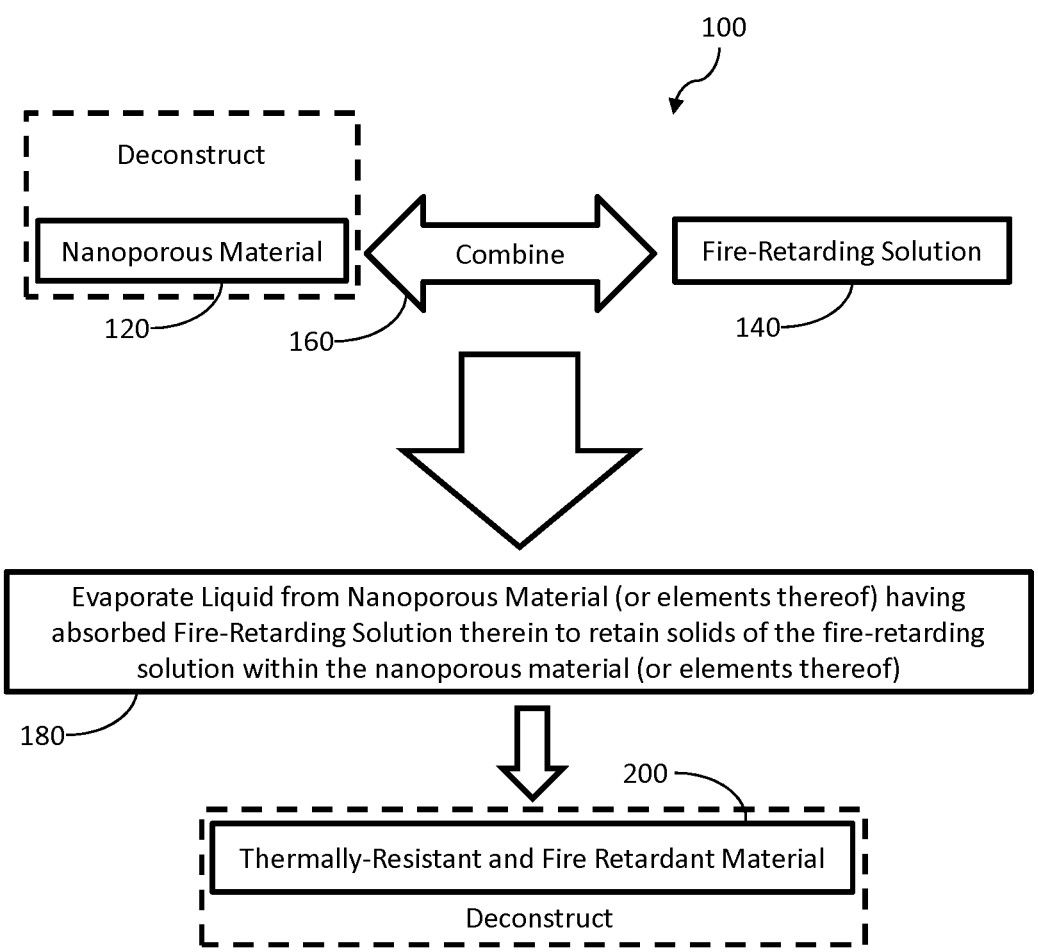

the fire-retarding solution absorbed therein such that a concentrate or solids thereof remain within the elements of the nanoporous material.

6 Claims, 2 Drawing Sheets

(51) Int. Cl.
    *C09C 3/08*     (2006.01)
    *C09K 21/04*     (2006.01)
    *C09K 21/08*     (2006.01)
    *C09K 21/10*     (2006.01)
    *C09K 21/12*     (2006.01)
    *F16L 59/02*     (2006.01)

(52) U.S. Cl.
    CPC ................ *C09C 3/08* (2013.01); *C09K 21/04* (2013.01); *C09K 21/08* (2013.01); *C09K 21/10* (2013.01); *C09K 21/12* (2013.01); *F16L 59/028* (2013.01)

(58) Field of Classification Search
    CPC ........ C09K 21/10; C09K 21/12; C09K 21/02; F16L 59/028; F16L 59/00; C09D 7/62; C09D 5/18
See application file for complete search history.

(56) References Cited

U.S. PATENT DOCUMENTS

| | | | | |
|---|---|---|---|---|
| 8,785,523 | B2* | 7/2014 | Miller | C08J 3/212 524/80 |
| 2011/0171074 | A1* | 7/2011 | Nakao | B32B 27/06 422/120 |
| 2012/0142240 | A1* | 6/2012 | Eling | C08G 18/36 977/773 |
| 2013/0143021 | A1* | 6/2013 | Miller | C08J 3/212 252/604 |
| 2013/0171223 | A1* | 7/2013 | Zhou | A61K 31/07 514/252.19 |
| 2015/0258028 | A1* | 9/2015 | Csikasz | A23L 33/30 424/724 |
| 2019/0022622 | A1* | 1/2019 | Park | B01J 20/226 |
| 2023/0272229 | A1* | 8/2023 | Blair | C09D 5/18 524/545 |

FOREIGN PATENT DOCUMENTS

| | | |
|---|---|---|
| CN | 107457858 | 12/2017 |
| CN | 108976953 | 12/2018 |
| CN | 110130148 A | 8/2019 |

* cited by examiner

THERMALLY INSULATING AND FIRE RETARDANT MATERIAL AND METHOD FOR MAKING SAME

CROSS-REFERENCE TO RELATED APPLICATIONS

This application is a national stage filing under 35 U.S.C. 371 of PCT/CA2020/051308, filed Sep. 30, 2020, which International Application was published by the International Bureau in English on Apr. 8, 2021, as WO 2021/062538, and application claims priority from U.S. Provisional Application No. 62/908,434, filed on Sep. 30, 2019, which applications are hereby incorporated in their entirety by reference in this application.

BACKGROUND

Field of the Disclosure

The present disclosure relates to fire retardant materials and, more particularly to a thermally-insulating and fire retardant material and method for making such a material.

Description of Related Art

Conventional intumescent paints may offer some passive thermal protection, though generally only do so when exposed to heat in the range of 200 to 250 degrees Celsius (and intumesce). At ambient temperatures, neither intumescent nor non-intumescent paints act as a thermal barrier to a significant degree. That is, intumescent or non-intumescent paints generally do not provide any protection to the loss of heat through conduction or radiation, and thus do not provide a significant insulation value.

In addition, such intumescent paints may be required to be applied in several layers to attain the required thickness for the intumescent element to appropriately intumesce and function as a fire retardant in the event of exposure of the coated object to flame or elevated temperature. In attaining the required coating thickness, it is difficult to obtain a smooth surface finish with an intumescent paint. Without the intumescent element, the base resin of the paint is generally flammable.

As such, there exists a need for a thermally-insulating material that, at ambient temperatures, will decrease the loss of heat therethrough due to radiation or conduction and reduce or prevent heat transfer, for example, due to thermal bridging. In the event of a fire, such a material should also be fire-retardant (and/or fire-resistant/heat resistant). Such a material having thermally insulating and fire-retardant (and/or fire-resistant/heat resistant) properties should also desirably provide and/or impart the thermal insulation and fire/heat resistance properties to a subsequent mixture to which the material is added to form a thermally-insulating and fire-retardant or fire-resistant product such as, for example, to a mixture including a polymeric resin so as to form a coating.

SUMMARY

The above and other needs are met by aspects of the present disclosure which, in one aspect, provides a method of forming a fire retardant material, comprising combining a nanoporous material and a fire-retarding solution such that elements of the nanoporous material absorb the fire retarding solution; and evaporating liquid from the elements of the nanoporous material having the fire-retarding solution absorbed therein such that a concentrate or solids thereof remain within the elements of the nanoporous material.

Still another aspect of the present disclosure provides a fire retardant material, comprising a deconstructed nanoporous material including a plurality of elements; and solids of a fire-retarding solution within the elements of the nanoporous material.

Yet another aspect of the present disclosure provides a thermally-insulating and fire retardant or fire-resistant product, comprising a product matrix; and a deconstructed nanoporous material mixture received by the product matrix, the deconstructed nanoporous material mixture including a plurality of elements of a deconstructed silica-based nanoporous material and a plurality of elements of a deconstructed silicate-based nanoporous material, the elements of each deconstructed nanoporous material having solids of a fire-retarding solution therein.

The present disclosure thus includes, without limitation, the following embodiments:

Embodiment 1: A method of forming a fire retardant material, comprising combining a nanoporous material and a fire-retarding solution such that elements of the nanoporous material absorb the fire retarding solution; and evaporating liquid from the elements of the nanoporous material having the fire-retarding solution absorbed therein such that a concentrate or solids thereof remain within the elements of the nanoporous material.

Embodiment 2: The method of any preceding embodiment, or any combination of preceding embodiments, wherein combining the nanoporous material and the fire-retarding solution comprises combining a silica-based nanoporous material or a silicate-based nanoporous material with the fire-retarding solution.

Embodiment 3: The method of any preceding embodiment, or any combination of preceding embodiments, wherein combining the nanoporous material and the fire-retarding solution comprises combining a silica aerogel nanoporous material or a silicate mineral nanoporous material having a silicon-oxygen bond with the fire-retarding solution.

Embodiment 4: The method of any preceding embodiment, or any combination of preceding embodiments, wherein combining the nanoporous material and the fire-retarding solution comprises combining an open pore nanoporous material and the fire-retarding solution.

Embodiment 5: The method of any preceding embodiment, or any combination of preceding embodiments, wherein the elements of the nanoporous material define a pore diameter of less than about 100 nm, and wherein combining the nanoporous material and the fire-retarding solution comprises combining the fire-retarding solution with the elements of the nanoporous material, the elements including any of a submicroporous material defining a pore diameter of less than about 0.4 nm, an ultramicroporous material having a pore diameter of less than about 0.7 nm, a supermicroporous material defining a pore diameter of between about 0.7 nm and about 2.0 nm, a microporous material defining a pore diameter of less than about 2.0 nm, a mesoporous material defining a pore diameter of between about 2.0 nm and about 50.0 nm, and a macroporous material defining a pore diameter of between greater than about 50.0 nm and less than about 100.0 nm.

Embodiment 6: The method of any preceding embodiment, or any combination of preceding embodiments, wherein combining the nanoporous material and the fire-retarding solution comprises combining the nanoporous material and the fire-retarding solution comprising a boron compound, a phosphorus compound, a chlorine compound, a lithium compound, a fluorine compound, an antimony compound, a borate compound, boric acid, an inorganic hydrate, a bromine compound, an aluminum compound, magnesium hydroxide, a phosphonium salt, a zirconium salt, ammonium phosphate, diammonium phosphate, methyl bromide, methyl iodide, bromochlorodifluoromethane, dibromotetrafluoroethane, dibromodifluoromethane, urea, guanidine, a guanidine salt, or combinations thereof.

Embodiment 7: The method of any preceding embodiment, or any combination of preceding embodiments, wherein evaporating liquid from the elements of the nanoporous material having the fire-retarding solution absorbed therein comprises spray drying the elements of the nanoporous material having the fire-retarding solution absorbed therein.

Embodiment 8: The method of any preceding embodiment, or any combination of preceding embodiments, comprising treating the elements of the nanoporous material to render the nanoporous material hydrophilic, prior to combining the nanoporous material and the fire-retarding solution.

Embodiment 9: A fire retardant material, comprising a deconstructed nanoporous material including a plurality of elements; and solids of a fire-retarding solution within the elements of the deconstructed nanoporous material.

Embodiment 10: The fire retardant material of any preceding embodiment, or any combination of preceding embodiments, wherein the deconstructed nanoporous material comprises a deconstructed silica-based nanoporous material or a deconstructed silicate-based nanoporous material.

Embodiment 11: The fire retardant material of any preceding embodiment, or any combination of preceding embodiments, wherein the deconstructed nanoporous material comprises a deconstructed silica aerogel nanoporous material or a deconstructed silicate mineral nanoporous material having a silicon-oxygen bond.

Embodiment 12: The fire retardant material of any preceding embodiment, or any combination of preceding embodiments, wherein the nanoporous material comprises an open pore nanoporous material.

Embodiment 13: The fire retardant material of any preceding embodiment, or any combination of preceding embodiments, wherein the elements of the nanoporous material define a pore diameter of less than about 100 nm, and include any of a submicroporous material defining a pore diameter of less than about 0.4 nm, an ultramicroporous material having a pore diameter of less than about 0.7 nm, a supermicroporous material defining a pore diameter of between about 0.7 nm and about 2.0 nm, a microporous material defining a pore diameter of less than about 2.0 nm, a mesoporous material defining a pore diameter of between about 2.0 nm and about 50.0 nm, and a macroporous material defining a pore diameter of between greater than about 50.0 nm and less than about 100.0 nm.

Embodiment 14: The fire retardant material of any preceding embodiment, or any combination of preceding embodiments, wherein the solids of the fire-retarding solution are included within the elements of the deconstructed nanoporous material and result from evaporation of liquid from the elements of the deconstructed nanoporous material having the fire-retarding solution absorbed therein.

Embodiment 15: The fire retardant material of any preceding embodiment, or any combination of preceding embodiments, further comprising a concentrate of the fire-retarding solution included within the elements of the deconstructed nanoporous material resulting from partial evaporation of liquid from the elements of the deconstructed nanoporous material having the fire-retarding solution absorbed therein.

Embodiment 16: The fire retardant material of any preceding embodiment, or any combination of preceding embodiments, wherein the solids of the fire-retarding solution comprise crystalline solids resulting from evaporation of liquid from the fire-retarding solution.

Embodiment 17: The fire retardant material of any preceding embodiment, or any combination of preceding embodiments, wherein the fire-retarding solution comprises a boron compound, a phosphorus compound, a chlorine compound, a lithium compound, a fluorine compound, an antimony compound, a borate compound, boric acid, an inorganic hydrate, a bromine compound, an aluminum compound, magnesium hydroxide, a phosphonium salt, a zirconium salt, ammonium phosphate, diammonium phosphate, methyl bromide, methyl iodide, bromochlorodifluoromethane, dibromotetrafluoroethane, dibromodifluoromethane, urea, guanidine, a guanidine salt, or combinations thereof.

Embodiment 18: The fire retardant material of any preceding embodiment, or any combination of preceding embodiments, wherein the deconstructed nanoporous material comprises a hydrophilic deconstructed nanoporous material.

Embodiment 19: The fire retardant material of any preceding embodiment, or any combination of preceding embodiments, wherein the fire-retarding solution comprises one of an aqueous fire-retarding solution, a nontoxic liquid fire-retarding solution, and a neutral pH liquid fire-retarding solution.

Embodiment 20: A thermally-insulating and fire retardant or fire-resistant product, comprising a product matrix; and a plurality of elements of a deconstructed silica-based nanoporous material and a plurality of elements of a deconstructed silicate-based nanoporous material, the elements of each deconstructed nanoporous material having solids of a fire-retarding solution therein.

Embodiment 21: The product of any preceding embodiment, or any combination of preceding embodiments, wherein the deconstructed silica-based nanoporous material comprises a deconstructed silica aerogel nanoporous material.

Embodiment 22: The product of any preceding embodiment, or any combination of preceding embodiments, wherein the deconstructed silicate-based nanoporous material comprises a deconstructed silicate mineral nanoporous material having a silicon-oxygen bond.

Embodiment 23: The product of any preceding embodiment, or any combination of preceding embodiments, wherein the deconstructed silica-based nanoporous material or the deconstructed silicate-based nanoporous material comprises an open pore nanoporous material.

Embodiment 24: The product of any preceding embodiment, or any combination of preceding embodiments, wherein the elements of the deconstructed silica-based nanoporous material and the deconstructed silicate-based nanoporous material define a pore diameter of less than about 100 nm, and the elements include any of a submicroporous material defining a pore diameter of less than about 0.4 nm, an ultramicroporous material having a pore diameter of less than about 0.7 nm, a supermicroporous material defining a pore diameter of between about 0.7 nm and about 2.0 nm, a microporous material defining a pore diameter of less than about 2.0 nm, a mesoporous material defining a pore diameter of between about 2.0 nm and about 50.0 nm, and a macroporous material defining a pore diameter of between greater than about 50.0 nm and less than about 100.0 nm.

Embodiment 25: The product of any preceding embodiment, or any combination of preceding embodiments, wherein the solids of the fire-retarding solution are included within the elements of the deconstructed silica-based nanoporous material or the deconstructed silicate-based nanoporous material, and result from evaporation of liquid from the deconstructed silica-based nanoporous material or the deconstructed silicate-based nanoporous material having the fire-retarding solution absorbed therein.

Embodiment 26: The product of any preceding embodiment, or any combination of preceding embodiments, further comprising a concentrate of the fire-retarding solution included within the elements of the deconstructed silica-based nanoporous material or the deconstructed silicate-based nanoporous material, resulting from partial evaporation of liquid from the deconstructed silica-based nanoporous material or the deconstructed silicate-based nanoporous material having the fire-retarding solution absorbed therein.

Embodiment 27: The product of any preceding embodiment, or any combination of preceding embodiments, wherein the solids of the fire-retarding solution comprise crystalline solids resulting from evaporation of liquid from the fire-retarding solution.

Embodiment 28: The product of any preceding embodiment, or any combination of preceding embodiments, wherein the fire-retarding solution comprises a boron compound, a phosphorus compound, a chlorine compound, a lithium compound, a fluorine compound, an antimony compound, a borate compound, boric acid, an inorganic hydrate, a bromine compound, an aluminum compound, magnesium hydroxide, a phosphonium salt, a zirconium salt, ammonium phosphate, diammonium phosphate, methyl bromide, methyl iodide, bromochlorodifluoromethane, dibromotetrafluoroethane, dibromodifluoromethane, urea, guanidine, a guanidine salt, or combinations thereof.

Embodiment 29: The product of any preceding embodiment, or any combination of preceding embodiments, wherein the deconstructed silica-based nanoporous material or the deconstructed silicate-based nanoporous material comprises a hydrophilic deconstructed silica-based nanoporous material or a hydrophilic deconstructed silicate-based nanoporous material.

Embodiment 30: A method of forming thermally-insulating and fire retardant or fire-resistant product, comprising combining a silica-based nanoporous material and a fire-retarding solution such that elements of the silica-based nanoporous material absorb the fire retarding solution; combining a silicate-based nanoporous material and a fire-retarding solution such that elements of the silicate-based nanoporous material absorb the fire retarding solution; evaporating liquid from the elements of the silica-based and silicate-based nanoporous materials having the fire-retarding solution absorbed therein such that a concentrate or solids thereof remain within the elements of the silica-based and silicate-based nanoporous materials; and adding the elements of the silica-based and silicate-based nanoporous materials having the concentrate or solids of the fire-retarding solution remaining therein to a product matrix to form the thermally-insulating and fire retardant or fire-resistant product.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 2:
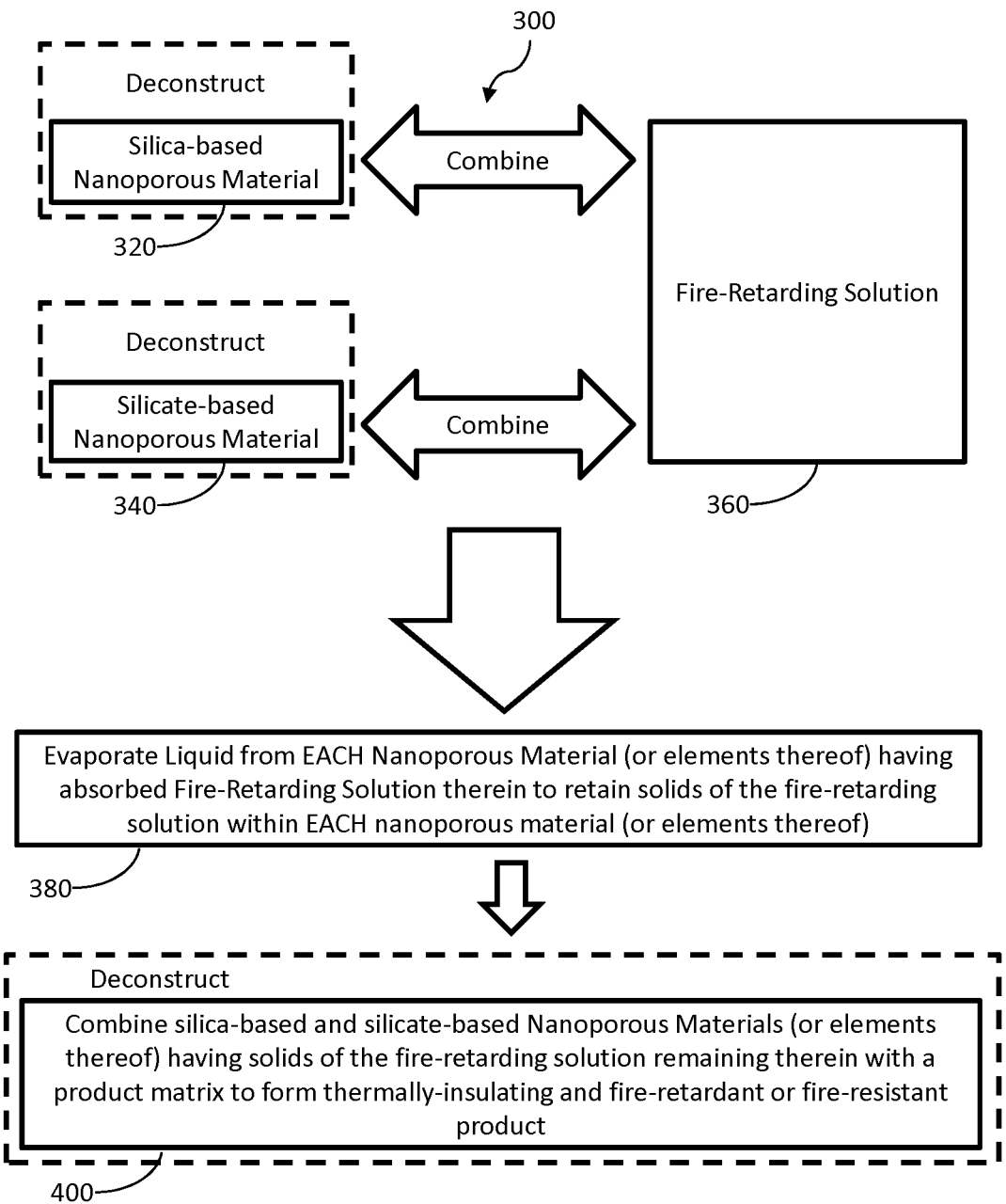

Having thus described the disclosure in general terms, reference will now be made to the accompanying drawings, which are not necessarily drawn to scale, and wherein:

FIG. 1 schematically illustrates a method of forming a fire retardant material, according to one aspect of the present disclosure; and FIG. 2 schematically illustrates a method of forming a thermally-insulating and fire retardant or fire-resistant product, according to one aspect of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 1 schematically illustrates a method of forming a thermally insulating and fire-retardant material, the method being generally indicated by element 100. According to certain aspects of the disclosure, such a method includes combining or mixing a nanoporous material 120 including a plurality of element (e.g., a powder, a granular mixture, or other deconstructed solid) with a liquid fire-retarding solution 140 such that the liquid fire-retarding solution is absorbed by the elements of the nanoporous material. In some instances, the nanoporous material 120 comprises a silica-based, silicate-based, or silicon dioxide-based nanoporous material. In other particular instances, the nanoporous material 120 comprises a silica (silicon dioxide) aerogel nanoporous material or a silicate mineral nanoporous material having a silicon-oxygen bond. The nanoporous material 120, in some instances, is an open-pore nanoporous material. An example of such a silica-based or silicon dioxide-based nanoporous material includes any commercially available amorphous silica (silicon dioxide) materials generally designated as an aerogel. An example of such a silicate mineral nanoporous material having a silicon-oxygen bond includes vermiculite. Though referred to in some examples herein as being a deconstructed material, the nanoporous material may or may not necessarily be deconstructed/refined prior to the combination with the fire-retarding solution. That is, in some aspects, the nanoporous material is not deconstructed/refined prior to the combination with the fire-retarding solution, but can be deconstructed following combination with the fire-retarding solution, if necessary or desired. Deconstructing/refining the nanoporous material refers to processing the nanoporous materials into a plurality of elements forming a powder, a granular mixture, or the like)

Non-limiting examples of suitable nanoporous materials implemented in connection with the present disclosure can include Enersens Kwark® aerogel, Svenska Quartzene® Z1 aerogel, Cabot Enova® aerogel, and JIOS AeroVa® aerogel. In one instance, the nanoporous material 120 comprises, for example, NANOLIT® carbon aerogel and/or UNINANO TS-Powder® aerogel, which generally demonstrate high surface area and exhibit resistance to heat. Particularly, NANOLIT® has a surface area of between about 700 and about 1500 $m^2/g$ and a density of about 0.5 g/cc, while TS-Powder® has a surface area of between about 600 and about 1000 $m^2/g$ and a density of between about 0.06 and about 0.38 g/cc. Such example aerogels generally demonstrate a low thermal conductivity $\lambda$ and do not absorb liquid water (hydrophobic), but are permeable to water vapor. Generally, such example aerogels do not include fungicides, algaecides, pesticides, binding agents, or flame retardants, and do not react with other materials. However, one skilled in the art will appreciate that the nanoporous material can comprise or include many different compounds, organic or inorganic (e.g., precipitated silica), which may be available under many different trade names.

The nanoporous material may be deconstructed/refined, as appropriate, in order to attain a deconstructed nanoporous material 120 including a plurality of elements as disclosed herein. For example, the nanoporous material can be chopped, ground, or pulverized or otherwise subject to suitable processing to reduce and deconstruct larger elements of the nanoporous material into smaller elements having a desired level of refinement as reflected, for example, in an average particle size range. According to aspects of the present disclosure, the nanoporous material 120, upon being deconstructed into a plurality of elements may desirably have an average element size within the range of between about 0.5 mm and about 1.5 mm. In some aspects of the present disclosure, very fine particles or elements of the nanoporous material 120, typically an average element size of below about 0.1 mm, may also be added (e.g., in addition to the deconstructed nanoporous material), to fit within or provide packing in interstices between the larger sized particles elements of the deconstructed nanoporous material. The nanoporous material may be deconstructed into the plurality of elements via mechanical processing such as, for example, through a hammermill or other suitable processing device.

In some aspects, the term "nanoporous material" is defined as a material or elements of the material having a pore diameter or average pore diameter of less than about 100 nm, and may include elements of a single porous material or a combination of elements of multiple porous materials. For example, suitable porous materials that can be used separately, or combined, as elements of the nanoporous material include elements of any of a submicroporous material defining a pore diameter of less than about 0.4 nm, an ultramicroporous material having a pore diameter of less than about 0.7 nm, a supermicroporous material defining a pore diameter of between about 0.7 nm and about 2.0 nm, a microporous material defining a pore diameter of less than about 2.0 nm, a mesoporous material defining a pore diameter of between about 2.0 nm and about 50.0 nm, a macroporous material defining a pore diameter of between greater than about 50.0 nm and less than about 100.0 nm, and any combination thereof.

In some aspects, the fire-retarding solution 140 is a liquid solution comprising a boron compound, a phosphorus compound, a chlorine compound, a lithium compound, a fluorine compound, an antimony compound, a borate compound, boric acid, an inorganic hydrate, a bromine compound, an aluminum compound, magnesium hydroxide, a phosphonium salt, a zirconium salt, ammonium phosphate, diammonium phosphate, methyl bromide, methyl iodide, bromochlorodifluoromethane, dibromotetrafluoroethane, dibromodifluoromethane, urea, guanidine, a guanidine salt, or combinations thereof. In addition, the fire-retarding solution 140 may be implemented as one of an aqueous liquid fire-retarding solution, a nontoxic liquid fire-retarding solution, and a neutral pH liquid fire-retarding solution.

The nanoporous material 120 (whether deconstructed or not deconstructed) and the liquid fire-retarding solution 140 are combined such that the nanoporous material (or elements thereof) absorbs the liquid fire retarding solution (block 160). Once absorbed or otherwise combined/mixed for a sufficient time to permit absorption, the liquid is evaporated from the nanoporous material (or elements thereof) having the fire-retarding solution absorbed therein (block 180) such that a concentrate of the fire-retarding solution and/or the solids thereof remain within the nanoporous material (or elements thereof). More particularly, the solids remaining in the nanoporous material (or elements thereof) are, for example, crystalline solids resulting from evaporation of liquid from the fire-retarding solution. In some instances, the liquid is not completely evaporated from the fire-retarding solution absorbed by the nanoporous material (or elements thereof), thus leaving a concentrate of the fire-retarding solution absorbed within the nanoporous material (or elements thereof).

One skilled in the art will appreciate that the liquid can be evaporated from the nanoporous material (or elements thereof) having the fire-retarding solution absorbed therein, in different appropriate manners. For example, the nanoporous material (or elements thereof) having the fire-retarding solution absorbed therein may be heated to evaporate the liquid. In other instances, the nanoporous material (or elements thereof) having the fire-retarding solution absorbed therein may have the liquid evaporated therefrom by subjecting the saturated nanoporous material (or elements thereof) to a heating process (including a microwave heating process), a spray drying process, and/or any other suitable process to remove at least some of the liquid from the fire-retarding solution absorbed by the nanoporous material (or elements thereof). That is, it may be sufficient to evaporate at least a portion or particular amount of the liquid from the fire-retarding solution such that the precipitates of the increasingly-concentrated (less liquid) fire-retarding solution, a more highly-concentrated fire-retarding solution, and/or solids of the fire-retarding solution sufficiently remain within the pores or otherwise remain engaged with a surface of the nanoporous material or elements thereof.

In some aspects, prior to combining the nanoporous material and the liquid fire-retarding solution, is may be necessary or desirable to first treat the nanoporous material to render the nanoporous material (or elements thereof) hydrophilic. That is, the nanoporous material (e.g., NANO-LIT®, etc.) may be hydrophobic as-produced, or may be hydrophobic as a result of a post-manufacturing treatment applied thereto by the manufacturer (e.g., made hydrophobic through the use of a silylating agent), for example, to prevent the nanoporous material from absorbing moisture from the immediate environment. Accordingly, prior to being implemented as disclosed herein, particularly in instances where the liquid fire-retarding solution is absorbed by the nanoporous material, the nanoporous material may be first treated to render the nanoporous material hydrophilic. More particularly, in some instances, an example silylating agent used to render the hydrophilic nanoporous material hydrophobic is trimethylchlorosilane (TMCS), having a boiling point of 57° C. In order to remove the TMCS and/or any other silylating agents from the treated (hydrophobic) nanoporous material, for example, the treated nanoporous material may be placed in a forced (air) circulating oven and heated to approximately 10° C. under the boiling point of the silylating agent used to render the nanoporous material hydrophobic (e.g., heat the hydrophobic nanoporous material to a certain temperature associated with the boiling point of the silylating agent, but without sintering the nanoporous material).

Once the hydrophilic nanoporous material having the fire-retarding solution absorbed therein is processed to remove (e.g., evaporate, dewater, or de-liquify) a sufficient amount of the liquid associated with the fire-retarding solution, the nanoporous material having the concentrates and/or solids of the fire-retarding solution therein may be deconstructed/refined if not previously deconstructed prior to the combination with the fire-retarding solution, or further deconstructed/refined if appropriate, necessary or desirable, in order to attain a suitable level of refinement as required. For example, the nanoporous material having the concentrates and/or solids of the fire-retarding solution therein can be chopped, ground, or pulverized or otherwise subject to suitable processing to reduce and deconstruct/refine larger elements thereof into smaller elements (e.g., a powder, a granular material, etc.) having a desired level of refinement as reflected, for example, in an average particle size range. In some aspects of the present disclosure, the nanoporous material having the concentrates and/or solids of the fire-retarding solution therein, upon being deconstructed into a plurality of elements may desirably have an average element size within the range of between about 0.5 mm and about 1.5 mm. In other aspects of the present disclosure, very fine particles of the nanoporous material having the concentrates and/or solids of the fire-retarding solution therein, typically an average element size of below about 0.1 mm, may also be added (e.g., in addition to the elements of the deconstructed nanoporous material having the concentrates and/or solids of the fire-retarding solution therein), to fit within or provide packing in interstices between the larger sized particles or elements of deconstructed nanoporous material having the concentrates and/or solids of the fire-retarding solution therein. The nanoporous material having the concentrates and/or solids of the fire-retarding solution therein may be deconstructed/refined via mechanical processing such as, for example, through a hammermill or other suitable processing device.

The insulating properties of the nanoporous material 120, as well as the flame/fire resistance afforded to the nanoporous material 120 by the solids of the fire-retarding solution 140, in some aspects, thus allow the thermally insulating and fire-retardant (or fire-resistant) material resulting from the process to be added as an ingredient to other mixtures so as to impart these properties to those mixtures and the product resulting therefrom. For example, the refined/deconstructed nanoporous material having the concentrates and/or solids of the fire-retarding solution therein can be combined with a product matrix such as a polymeric resin to form a thermally-insulating, fire-retardant coating (product) having a homogenous consistency. That is, the refined and deconstructed nanoporous material having the concentrates and/or solids of the fire-retarding solution therein can be added to the product matrix such as the polymeric resin in a sufficient quantity and dispersed substantially uniformly therethrough such that the coating product exhibits a homogenous or uniform consistency, with the coating appearing smooth when applied to a surface. The insulating properties of the nanoporous material, as well as the flame/fire resistance afforded to the nanoporous material and the polymeric resin (e.g., by the concentrates and/or solids of the fire-retarding solution leaching from the nanoporous material and into the polymeric resin, upon the deconstructed nanoporous material having the concentrates and/or solids of the fire-retarding solution therein being added to or combined with the polymeric resin), thus obviates the need for other fire-retarding provisions in the coating, such as, for example, intumescent materials. Accordingly, the resulting coating (product), according to particular aspects of the present disclosure, lacking an intumescent material component, could therefore be designated as a non-intumescent coating. Further, the insulating properties of the nanoporous material impart a significant insulation value to the resulting coating as compared, for example, to an intumescent coating, while providing a comparatively smooth coating in relation to, for example, an intumescent coating. In addition, one skilled the art will further appreciate that other elements such as, for example, a surfactant, a thickener, a pigment, a fiber, or a combination thereof may also be added to the polymeric resin, as necessary or desired, for the properties and purposes exhibited by those additional elements. In such instances, the polymeric resin can comprise a vinyl chloride resin or other suitable resin material, such as a vinyl acetate ethylene copolymer resin, a styrene-acrylic resin, an acrylic resin, a polyurethane resin, a silicone resin, an epoxy resin, a butadiene resin, a vinyl acrylate resin, a silicate resin, a vinyl acetate-butylacrylate copolymer resin, a carboxylated polymer resin, a polyvinylidene fluoride polymer resin, or combinations thereof.

FIG. 2 schematically illustrates a method of forming a thermally-insulating and fire-retardant or fire-resistant product, the method being generally indicated by element 300. According to certain aspects of the disclosure, such a method includes combining a silica-based nanoporous material 320 and a fire-retarding solution 360 such that elements of the silica-based nanoporous material absorb the fire retarding solution, and combining a silicate-based nanoporous material 340 and a fire-retarding solution 360 such that elements of the silicate-based nanoporous material absorb the fire retarding solution. Liquid is evaporated or otherwise removed from the elements of the silica-based and silicate-based nanoporous materials having the fire-retarding solution absorbed therein such that a concentrate or solids thereof remain within the elements of the silica-based and silicate-based nanoporous materials 380. The elements of the silica-based and silicate-based nanoporous materials having the concentrate or solids of the fire-retarding solution remaining therein is added to a product matrix to form the thermally-insulating and fire retardant or fire-resistant product 400.

In other aspects, a thermally-insulating and fire retardant or fire-resistant product is achieved by implementing different deconstructed nanoporous materials each having the concentrates and/or solids of the fire-retarding solution therein within the same product matrix. For example, the thermally-insulating and fire retardant or fire-resistant product includes a product matrix (e.g., a polymeric resin as disclosed herein) and a combination of deconstructed nanoporous materials received by the product matrix. In one aspect, the combination of deconstructed nanoporous materials includes a plurality of elements of a deconstructed silica-based nanoporous material and a plurality of elements of a deconstructed silicate-based nanoporous material, the elements of each deconstructed nanoporous material having solids of a fire-retarding solution therein. In some instances, the deconstructed silica-based nanoporous material comprises a deconstructed silica aerogel nanoporous material, and the deconstructed silicate-based nanoporous material comprises a deconstructed silicate mineral nanoporous material having a silicon-oxygen bond, wherein examples of each deconstructed nanoporous material are otherwise disclosed herein.

In such aspects, the silicate-based nanoporous material can be selected to provide a higher temperature (e.g., greater than 150° C.) thermal insulation property than the silica-based nanoporous material, wherein the silica-based nonporous material may exhibit more favorable thermal insulation properties than the silicate-based nanoporous material at lower temperatures (e.g., less than 150° C.). Combining the two different nonporous materials in the product matrix thus provides the product with a good thermal insulation property (in addition to fire-retardant properties or fire resistance characteristics) across a temperature spectrum from ambient to higher temperatures that may be experienced by the product (e.g., exposure to fire or heat from a fire).

The deconstructed silica-based nanoporous material or the deconstructed silicate-based nanoporous material in some aspects, comprises an open pore nanoporous material. In particular aspects, the elements of the deconstructed silica-based nanoporous material and the deconstructed silicate-based nanoporous material define a pore diameter of less than about 100 nm, and the elements include any of a submicroporous material defining a pore diameter of less than about 0.4 nm, an ultramicroporous material having a pore diameter of less than about 0.7 nm, a supermicroporous material defining a pore diameter of between about 0.7 nm and about 2.0 nm, a microporous material defining a pore diameter of less than about 2.0 nm, a mesoporous material defining a pore diameter of between about 2.0 nm and about 50.0 nm, and a macroporous material defining a pore diameter of between greater than about 50.0 nm and less than about 100.0 nm As otherwise disclosed herein, the solids (e.g., crystalline solids resulting from evaporation of liquid from the fire-retarding solution) of the fire-retarding solution are included within the elements of the deconstructed silica-based nanoporous material or the deconstructed silicate-based nanoporous material, and result from evaporation of liquid from the deconstructed silica-based nanoporous material or the deconstructed silicate-based nanoporous material having the fire-retarding solution absorbed therein. In other aspects, a concentrate of the fire-retarding solution is included within the elements of the deconstructed silica-based nanoporous material or the deconstructed silicate-based nanoporous material, resulting from partial evaporation of liquid from the deconstructed silica-based nanoporous material or the deconstructed silicate-based nanoporous material having the fire-retarding solution absorbed therein. As also noted, in particular aspects, the fire-retarding solution comprises a boron compound, a phosphorus compound, a chlorine compound, a lithium compound, a fluorine compound, an antimony compound, a borate compound, boric acid, an inorganic hydrate, a bromine compound, an aluminum compound, magnesium hydroxide, a phosphonium salt, a zirconium salt, ammonium phosphate, diammonium phosphate, methyl bromide, methyl iodide, bromochlorodifluoromethane, dibromotetrafluoroethane, dibromodifluoromethane, urea, guanidine, a guanidine salt, or combinations thereof. In other aspects, the deconstructed silica-based nanoporous material or the deconstructed silicate-based nanoporous material comprises a hydrophilic deconstructed silica-based nanoporous material or a hydrophilic deconstructed silicate-based nanoporous material.

As such, aspects of the present disclosure provide a thermally insulating and fire-retardant (or fire-resistant) material capable of providing a thermal insulation property in a fire-exposure and/or ambient temperature situation by way of the nanoporous material(s). Moreover, the inclusion of the fire-retardant solution and/or solids of the fire-retarding solution imparts a fire-retarding (or fire-resistant) property to the nanoporous material. Subsequent inclusion of the thermally insulating and fire-retardant material in a mixture (e.g., in a polymeric resin to form a coating) can also result in the thermally insulating/fire-retardant properties being imparted to that mixture/product.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence That which is claimed:

1. A method of forming a fire retardant material, comprising:
    treating a plurality of elements of a nanoporous material, said treating including heating the nanoporous material, without sintering the nanoporous material, to render any hydrophobic elements of the nanoporous material unsintered and hydrophilic;
    combining the elements of the unsintered and hydrophilic nanoporous material, the nanoporous material comprising a silica-based nanoporous material or a silicate-based nanoporous material, and an aqueous fire-retarding solution such that the elements of the unsintered and hydrophilic nanoporous material absorb the aqueous fire retarding solution; and
    evaporating water from the elements of the nanoporous material having the aqueous fire-retarding solution absorbed therein such that a concentrate or solids thereof remain within the elements of the nanoporous material,
    wherein combining the elements of the nanoporous material and the aqueous fire-retarding solution comprises combining the elements of the nanoporous material and the aqueous fire-retarding solution comprising a boron compound, a phosphorus compound, a lithium compound, a fluorine compound, an antimony compound, a borate compound, boric acid, an inorganic hydrate, a bromine compound, an aluminum compound, magnesium hydroxide, a phosphonium salt, a zirconium salt, ammonium phosphate, diammonium phosphate, methyl bromide, methyl iodide, bromochlorodifluoromethane, dibromotetrafluoroethane, dibromodifluoromethane, urea, guanidine, or combinations thereof.

2. The method of claim 1, wherein combining the elements of the nanoporous material and the aqueous fire-retarding solution comprises combining the elements of the silica-based nanoporous material or the elements of the silicate-based nanoporous material having a silicon-oxygen bond with the aqueous fire-retarding solution.

3. The method of claim 1, wherein the silica-based nanoporous material or the silicate-based nanoporous material is an open pore nanoporous material, and wherein combining the elements of the nanoporous material and the aqueous fire-retarding solution comprises combining the elements of the open pore nanoporous material and the aqueous fire-retarding solution.

4. The method of claim 1, wherein the elements of the nanoporous material define a pore diameter of less than about 100 nm, and wherein combining the elements of the nanoporous material and the aqueous fire-retarding solution comprises combining the aqueous fire-retarding solution with the elements of the nanoporous material, the elements of the nanoporous material including any of a submicroporous material defining a pore diameter of less than about 0.4 nm, an ultramicroporous material having a pore diameter of less than about 0.7 nm, a supermicroporous material defining a pore diameter of between about 0.7 nm and about 2.0 nm, a microporous material defining a pore diameter of less than about 2.0 nm, a mesoporous material defining a pore diameter of between about 2.0 nm and about 50.0 nm, and a macroporous material defining a pore diameter of between greater than about 50.0 nm and less than about 100.0 nm.

5. The method of claim 1, wherein evaporating water from the elements of the nanoporous material having the aqueous fire-retarding solution absorbed therein comprises spray drying the elements of the nanoporous material having the aqueous fire-retarding solution absorbed therein.

6. A method of forming thermally-insulating and fire retardant or fire-resistant product, comprising:
    treating a silica-based nanoporous material, said treating including heating the silica-based nanoporous material, without sintering the silica-based nanoporous material, to render any hydrophobic elements of the silica-based nanoporous material unsintered and hydrophilic;
    treating a silicate-based nanoporous material, said treating including heating the silicate based nanoporous material, without sintering the silicate-based nanoporous material, to render any hydrophobic elements of the silicate-based nanoporous material unsintered and hydrophilic;
    combining the unsintered and hydrophilic silica-based nanoporous material and a fire-retarding solution such that elements of the unsintered and hydrophilic silica-based nanoporous material absorb the fire retarding solution, the fire-retarding solution comprising a boron compound, a phosphorus compound, a lithium compound, a fluorine compound, an antimony compound, a borate compound, boric acid, an inorganic hydrate, a bromine compound, an aluminum compound, magnesium hydroxide, a phosphonium salt, a zirconium salt, ammonium phosphate, diammonium phosphate, methyl bromide, methyl iodide, bromochlorodifluoromethane, dibromotetrafluoroethane, dibromodifluoromethane, urea, guanidine, or combinations thereof;
    combining the unsintered and hydrophilic silicate-based nanoporous material and the fire-retarding solution such that elements of the unsintered and hydrophilic silicate-based nanoporous material absorb the fire retarding solution;
    evaporating liquid from the elements of the silica-based and silicate-based nanoporous materials having the fire-retarding solution absorbed therein such that a concentrate or solids thereof remain within the elements of the silica-based and silicate-based nanoporous materials; and
    adding the elements of the silica-based and silicate-based nanoporous materials having the concentrate or solids of the fire-retarding solution remaining therein to a product matrix to form the thermally-insulating and fire retardant or fire-resistant product.

* * * * *